United States Patent [19]

Culkin

[11] Patent Number: 4,872,988
[45] Date of Patent: Oct. 10, 1989

[54] METHOD AND DEVICE FOR SEPARATION OF COLLOIDAL SUSPENSIONS

[76] Inventor: Joseph B. Culkin, 2810 Clay St., Alameda, Calif. 94501

[21] Appl. No.: 151,359

[22] Filed: Feb. 2, 1988

[51] Int. Cl.$^4$ .............................. B01D 13/00
[52] U.S. Cl. ................... 210/636; 210/646; 210/748; 210/785; 210/741; 210/321.78; 210/321.87; 210/384
[58] Field of Search ............ 210/321.78, 321.87, 210/384, 450, 748, 785, 388, 634, 636, 644–647, 649, 650–654, 791

[56] References Cited

U.S. PATENT DOCUMENTS

| | | | |
|---|---|---|---|
| 3,491,022 | 1/1970 | Huff | 210/19 |
| 3,785,969 | 1/1974 | Molls et al. | 210/19 |
| 3,864,249 | 2/1975 | Wallis | 210/19 |
| 3,870,640 | 3/1975 | Reece | 210/388 |
| 3,970,564 | 7/1976 | Shamsutdinov et al. | 210/323 |
| 4,028,232 | 6/1977 | Wallis | 210/19 |
| 4,062,768 | 12/1977 | Elliott | 209/341 |
| 4,076,623 | 2/1978 | Golston | 210/77 |
| 4,136,035 | 1/1979 | Bogomolov et al. | 210/388 |
| 4,166,034 | 8/1979 | Bodine | 210/784 |
| 4,208,289 | 6/1980 | Bray | 210/321 |
| 4,253,962 | 3/1981 | Thompson | 210/414 |
| 4,279,751 | 7/1981 | Fishgal | 210/388 |
| 4,312,756 | 1/1982 | Hug | 210/330 |
| 4,343,705 | 8/1982 | Legg | 210/637 |
| 4,346,011 | 8/1982 | Brownstein | 210/748 |
| 4,446,022 | 5/1984 | Harry | 210/388 |
| 4,517,086 | 5/1985 | Romey et al. | 210/323 |
| 4,526,688 | 7/1985 | Schmidt, Jr. et al. | 210/323 |
| 4,545,969 | 10/1985 | Diekotter et al. | 423/328 |
| 4,605,500 | 8/1986 | Takemura et al. | 210/450 |
| 4,636,312 | 1/1987 | Willis | 210/416 |
| 4,670,147 | 6/1987 | Schoendorfer et al. | 210/541 |
| 4,717,486 | 1/1988 | Shirato et al. | 210/785 |

FOREIGN PATENT DOCUMENTS 1488025 10/1977 United Kingdom .

OTHER PUBLICATIONS

Brochure UF002.
Operating Instructions Manual OM083, Millipore Corp., Bedford, Mass.
Legg et al., IL Review pp. 2–12.
Computer Search of Foreign Patent and Literature Data Base.

*Primary Examiner*—Frank Sever
*Attorney, Agent, or Firm*—Townsend & Townsend

[57] ABSTRACT

Particulates are separated from colloidal suspensions by filtration where the filter is oscillated relative to the suspension in order to inhibit plugging of the filter. Plugging is substantially eliminated and filtration rates greatly enhanced by oscillating the membrane at a sufficiently high frequency and with a sufficiently large displacement so that the Reynold's number of the relative flow is greater than about 1.

34 Claims, 5 Drawing Sheets

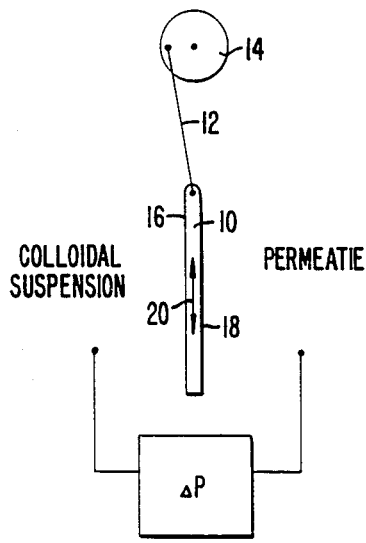
FIG._1.
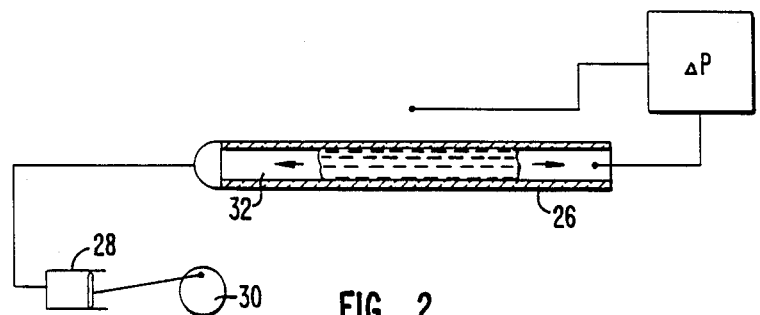
FIG._2.
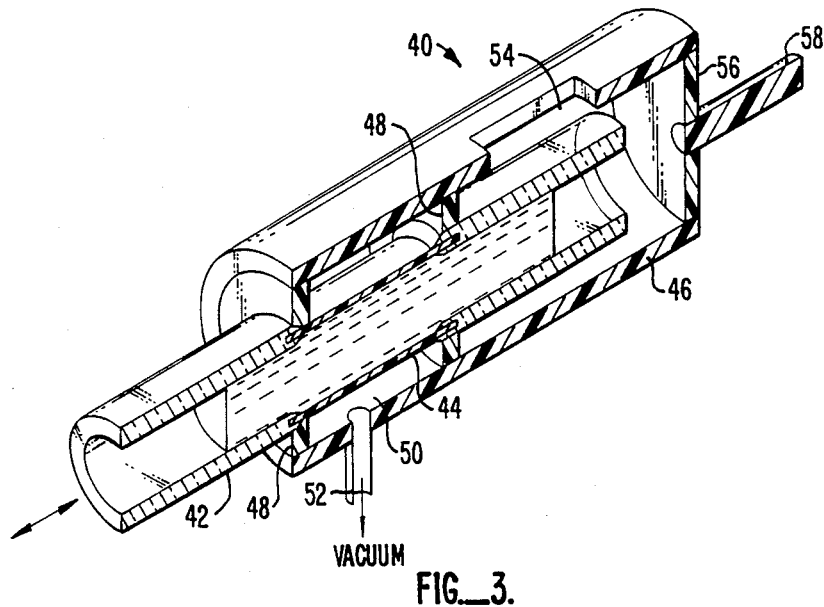
FIG._3.

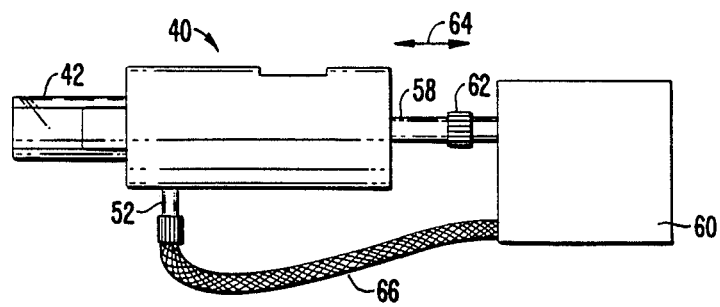
FIG._4.
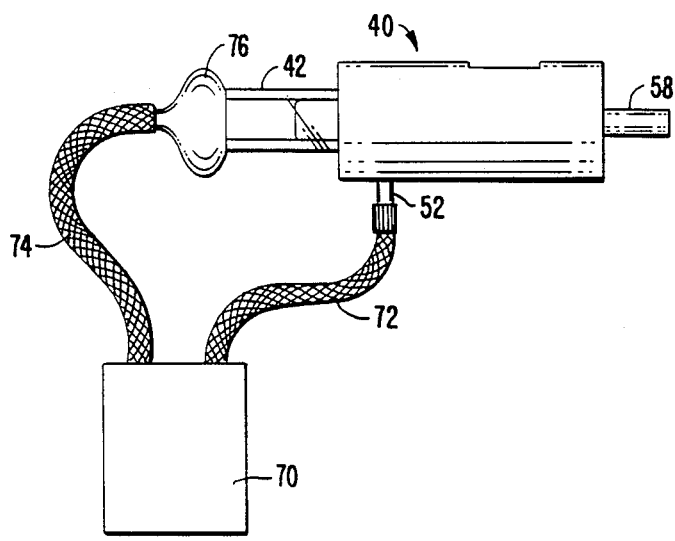
FIG._5.
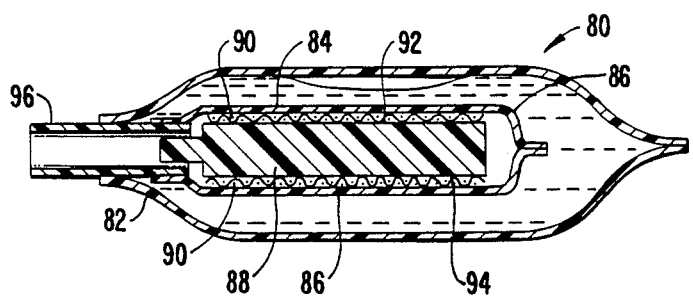
FIG._6.

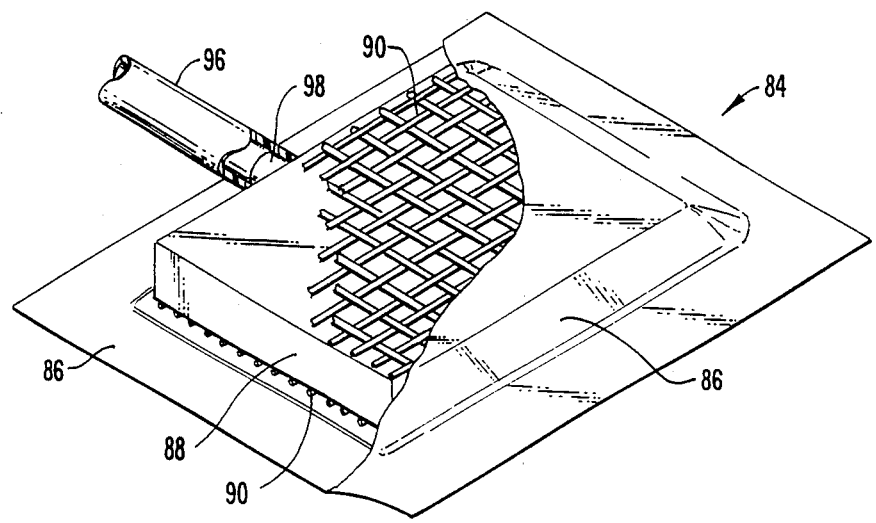
FIG._7.
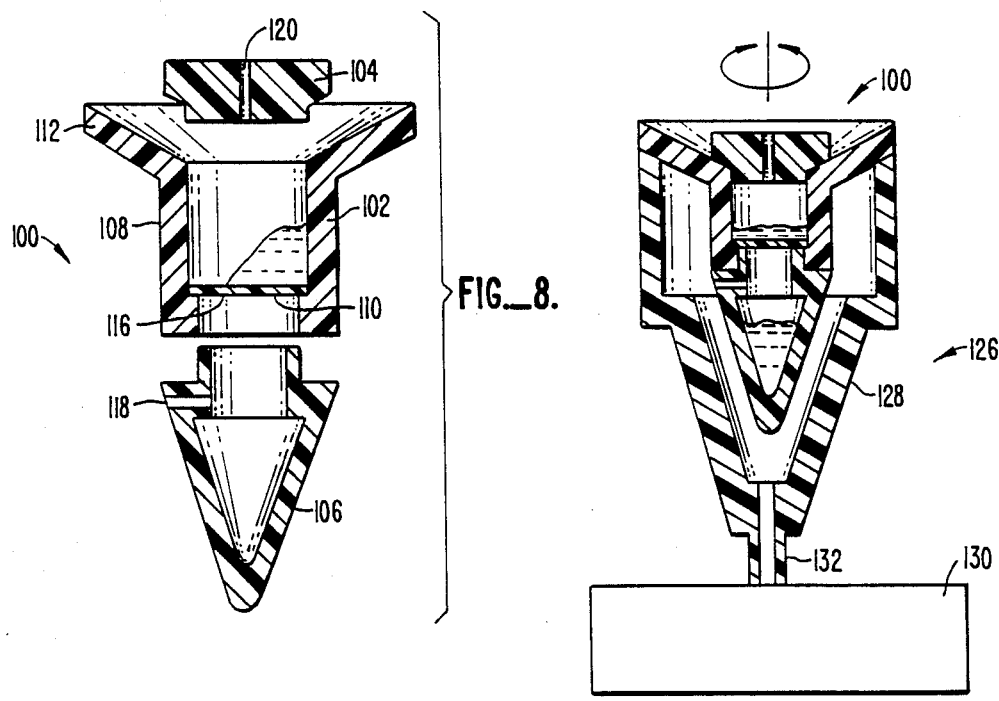
FIG._8.
FIG._9.

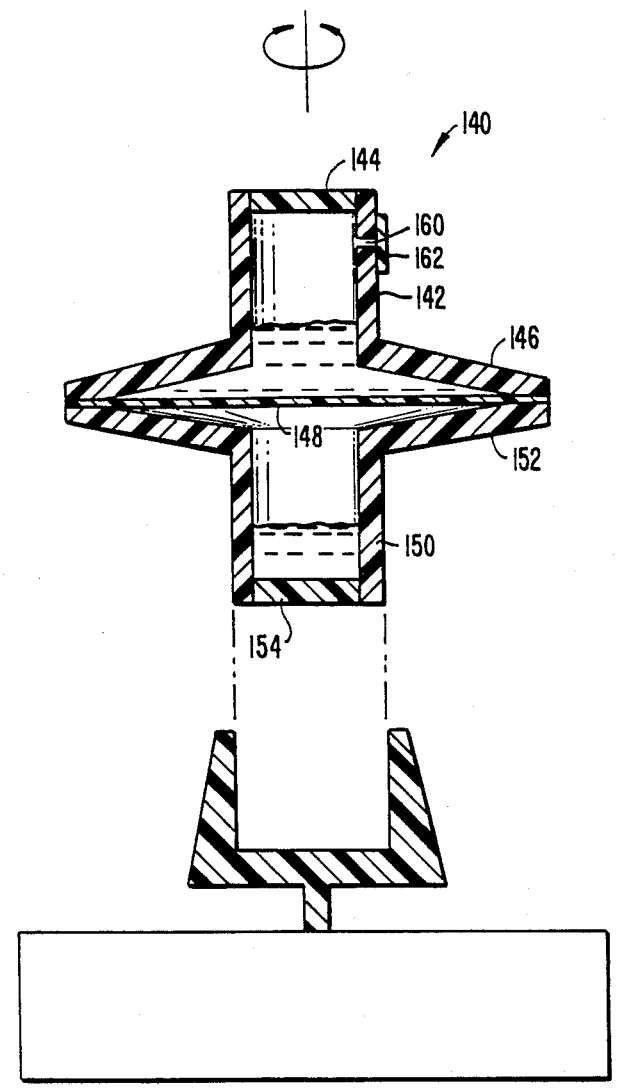
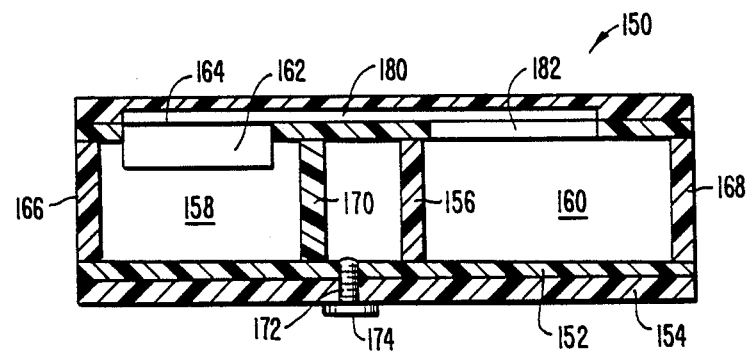
FIG._10.
FIG._11.

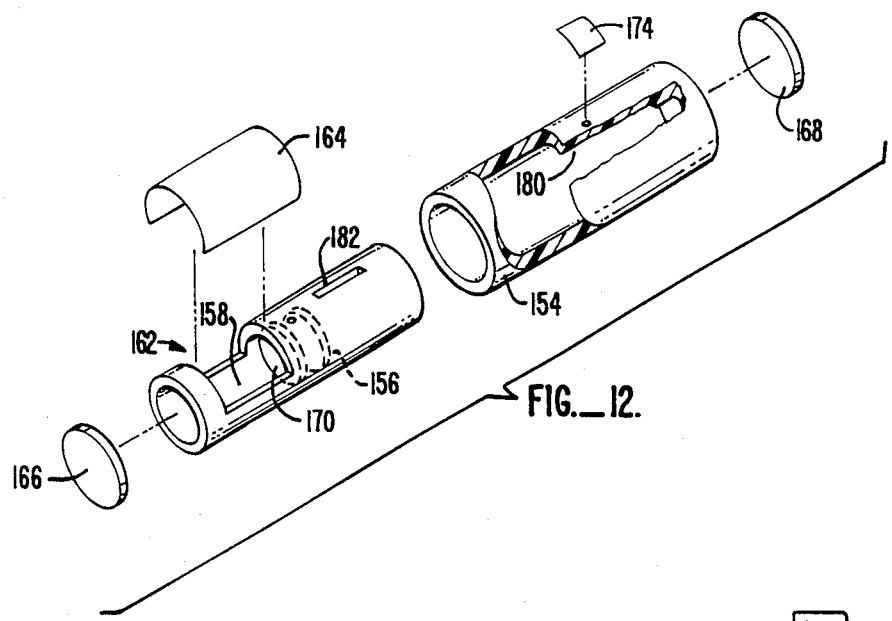
FIG._12.
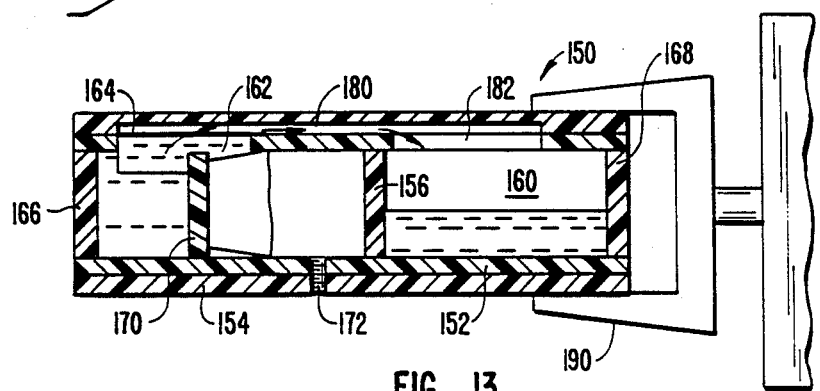
FIG._13.
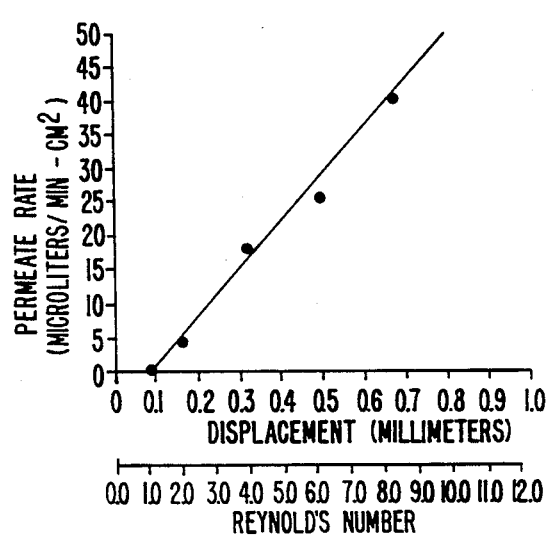
FIG._14.

METHOD AND DEVICE FOR SEPARATION OF COLLOIDAL SUSPENSIONS

BACKGROUND OF THE INVENTION

The present invention relates generally to the separation of particulates from colloidal suspensions, and more particularly to methods and apparatus for the separation of cellular components from blood to provide blood plasma.

The separation of particulates from colloidal suspensions is usually accomplished by either centrifugation or filtration. While centrifugation is relatively time consuming and requires relatively costly equipment, it is presently the only technology practical for the separation of small sample sizes, typically 5 mL and below. Filtration is substantially faster and more economic, but colloidal particles cause severe fouling and plugging of the filter membrane. Although such plugging can be at least partially overcome by utilizing a continuous shear flow over the membrane or pulsatile flow through the membrane, such approaches are not suitable for the-filtration of small volumes. Thus, it would be desirable to provide improved methods for the filtration of colloidal suspensions. It would be particularly desirable if such methods allowed the filtration of relatively small sample sizes below about 5 mL without plugging.

Most medical diagnostic testing is performed on small samples of blood plasma or serum. As blood is a colloidal suspension of cellular components in plasma, whole blood samples (which are generally on the order of several mL) are presently clotted and centrifuged in order to obtain blood serum prior to testing. Such clotting and centrifugation generally takes about 10 minutes or longer and requires the use of a relatively costly centrifuge. The use of filtration to prepare plasma from such small blood samples would be desirable as it is a more rapid and less costly procedure, generally requiring fewer steps than centrifugal separation of serum. The inability of present filtration technology to adequately separate such small volume colloidal suspensions, however, renders filtration impractical.

For these reasons, it would be desirable to provide improved filtration methods capable of separating particles from colloidal suspensions without suffering from deleterious plugging of the filter membrane. It would be particularly desirable if such methods could handle very small sample volumes, preferably 5 mL and below, and more preferably 100 $\mu$L and below. The filtration methods should be rapid and require only relatively inexpensive equipment to be performed. The methods should further be suitable for automated sample handling, requiring a minimum number of manual steps. In the case of plasma preparation from whole blood, it would be desirable if user exposure to the blood could be limited or avoided entirely, and that the plasma obtained be free from hemolysis and other degradation.

SUMMARY OF THE INVENTION

The present invention provides improved methods and apparatus for the filtration of colloidal suspensions. By inducing a relative oscillation between the surface of a filter membrane and the bulk of the colloidal suspension, plugging of the filter membrane is inhibited even for very small suspension volumes on the order of 5 mL and below. In particular, relative oscillation at a frequency and displacement sufficient to provide a Reynold's number of at least about 1 has been found to substantially inhibit the particulates in the suspension from forming a concentration polarization layer (which results in plugging of the filter membrane) allowing rapid separation of the colloidal suspension. Preferably, the relative motion between the bulk suspension and the membrane surface is at a frequency in the range from about 25 to 250 Hz, more preferably between about 60 and 200 Hz, and usually between about 120 and 180 Hz, and a maximum displacement in the range from about 0.3 to 5 mm, more preferably between 0.5 and 3 mm, and usually between about 1 and 2 mm.

Relative motion between the filter membrane and the bulk suspension is induced in a direction generally parallel to the membrane surface and normal to the flow of permeate (filtered fluid) therethrough. Depending on the membrane configuration, the reciprocation may be linear or rotational, with either the membrane or the bulk solution being reciprocated. The membrane will usually be reciprocated mechanically, although electromagnetic induction might also find use. The bulk solution may conveniently be reciprocated by applying an alternating pressure on opposite sides of the suspension volume. It is usually preferred to reciprocate the filter membrane as this provides the strongest shear force at the membrane surface, resulting in maximal inhibition of plugging. Flow through the filter is induced simultaneously with the relative reciprocation of the membrane and bulk suspension, conveniently by providing a differential pressure across the membrane.

A number of specific embodiments are set forth herein which are intended primarily for separating plasma from whole blood. The embodiments generally include a filter cartridge which is utilized in combination with a base unit having an oscillator for inducing relative motion between a filter membrane in the cartridge and the colloidal suspension. In its simplest form, the filter cartridge is a probe intended for immersion into an open volume of the colloidal suspension. In that case, the cartridge will include an exposed filter membrane which is connected to a negative pressure (vacuum) source for drawing fluid through the membrane while the cartridge is being oscillated. More usually, however, the filter cartridge will include a closed or open receptacle for holding a discrete sample of the colloidal suspension in contact with a membrane filter. A receiver mounted on the opposite side of the membrane filter collects the permeate passing through the filter, as the relative oscillation is induced simultaneously with a differential pressure being applied across the membrane.

BRIEF DESCRIPTION OF THE DRAWINGS

FIG. 1 is a schematic representation of the operating principle of the present invention.

FIG. 2 is a schematic representation of an alternate operating principle for the present invention.

FIG. 3 illustrates a first embodiment of a filter cartridge constructed in accordance with the principles of the present invention employing a capillary tube receptacle.

FIG. 4 illustrates a first approach for inducing relative oscillation between a filter membrane and bulk suspension in the capillary tube filter cartridge of FIG. 3.

FIG. 5 illustrates a second approach (as with FIG. 4) the capillary tube filter cartridge of FIG. 3.

FIG. 6 illustrates a second embodiment of a filter cartridge constructed in accordance with the principles of the present invention employing an internal filter membrane disposed inside a flexible bag receptacle.

FIG. 7 is a perspective view of the internal filter membrane of FIG. 6 probe showing its construction in greater detail.

FIG. 8 is an exploded view of a third embodiment of a filter cartridge constructed in accordance with the principles of the present invention employing a disk filter membrane which is rotationally oscillated about a central axis normal to its plane.

FIG. 9 illustrates the disk filter cartridge of FIG. 8 mounted in a base unit capable of inducing a rotary oscillation.

FIG. 10 illustrates a disk filter cartridge similar to that of FIG. 8 intended for use on relatively large liquid volumes.

FIG. 11 illustrates a filter cartridge constructed in accordance with the principles of the present invention and intended primarily for drawing blood samples and separating the blood sample into plasma within the cartridge.

FIG. 12 is an exploded view of the filter cartridge of FIG. 11.

FIG. 13 illustrates the filter cartridge of FIG. 11 during the plasma separation process.

FIG. 14 is a graph illustrating experimentally obtained permeation rates as a function of Reynold's number.

DESCRIPTION OF THE SPECIFIC EMBODIMENTS

According to the present invention, methods and apparatus are provided for the improved filtering of colloidal suspensions substantially free from plugging of the filter membrane which has heretofore been a problem. By providing a rigorous shear flow at the interface between the filter and the suspension, the concentration polarization layer primarily responsible for plugging of the filter membrane is removed. The shear flow is caused by oscillating the filter membrane relative to the suspension fluid at a frequency and displacement selected so that the relative motion has a Reynold's number greater than about 1.0. Preferably, the oscillatory frequency will be in the range from about 25 to 250 Hz, more preferably between about 60 and 200 Hz, usually being between about 120 and 180 Hz, and the maximum displacement will be in the range from about 0.3 to 5 mm, usually being in the range from about 0.5 to 3 mm, and usually being in the range from about 1 to 2 mm. While it has been found that oscillation of the membrane is most effective (as it provides a maximal shear flow at the boundary between the suspension fluid and the membrane), oscillation of the liquid suspension phase can also be effective, particularly in very small systems such as the capillary tube embodiment described hereinbelow. In either case, the relative oscillation is performed simultaneously with passage of the liquid suspension through the filter membrane, typically by providing a differential pressure across the membrane, in order to effect the desired filtering.

Apparatus of the present invention will usually include a filter cartridge assembly and a separate base unit for operating the filter cartridge assembly, although it would be possible to construct devices incorporating all components of the invention in a single unit. The filter cartridge assembly comprises a filter membrane having an upstream side and a downstream side, and a receiving chamber which is fluidly coupled to the downstream side of the filter membrane to collect permeate passing therethrough. Usually, a receptacle is provided on the upstream side of the membrane for holding a discrete volume of the colloidal suspension for filtration, although it is also possible to utilize the filter cartridge as a probe by immersion into an open volume of the colloidal suspension.

The base unit of the present invention will provide the oscillatory force required for effecting the relative oscillation between the filter membrane and the liquid suspension and, optionally, the differential pressure necessary for driving the permeate through the filter, although some filter cartridges will be initially evacuated below atmospheric pressure so that flow may be induced by exposing the receptacle to atmospheric pressure Typically, the oscillatory force will be provided by a mechanical linkage to the filter cartridge, although it would also be possible to utilize electromagnetic coupling. Differential pressure across the membrane is usually provided by the base unit which applies a negative pressure on the downstream side of the membrane (usually through a connection to the receiving chamber), a positive pressure to the upstream side of the membrane (usually through a connection to the receptacle), or both. Alternatively, in certain embodiments, having both a receptacle for holding the colloidal suspension and a receiver for the permeate, flow across the membrane may be induced by providing the filter cartridge with both the receptacle and receiver evacuated to subatmospheric pressure. After introducing the suspension to the receptacle, transmembrane flow is caused by venting the receptacle to the atmosphere so that the permeate enters the receiver which is still below atmospheric pressure. In certain large volume embodiments, it might be possible to rely on static pressure of the fluid in order to pass permeate through the membrane, although such unassisted flow will usually not be preferred. In the case of oscillations caused by reversing flow of the liquid suspension, the base unit will normally provide additional pressure connections on the receptacle in order to effect the desired flow reversals. Each of these aspects of the present invention will be described in greater detail in connection with the specific embodiments set forth hereinbelow.

Colloidal suspensions which may be separated by the present invention include a wide variety of particulates suspended in a liquid phase. The particulates may vary widely in size, typically having dimensions in the range from about $10^{-3}$ to 10 microns, with separation of particles in the size range from about 0.002 to 0.02 microns being referred to as ultrafiltration and separation of particles in the size range from about 0.02 to 10 microns being referred to as microfiltration. The liquid phase of the suspension may be aqueous or organic, usually being aqueous. The nature of the suspension is not critical, with separation of cellular components from blood and conditioned media being of primary present interest.

In the case of blood, the cellular components are typically sized in the range from about 1 to 8 microns, including erythrocytes, leukocytes, platelets, and cellular debris. The plasma fraction remaining after separation of the cellular components retains the proteins and other soluble factors characteristic of the whole blood sample. In particular, it has been found that the filtration of the present invention does not result in hemolysis which is unacceptable in plasma used for many purposes, including diagnosis and transfusion. In the case of conditioned media, the cellular components may be filtered, leaving the desired protein products in the permeate. The separation of the present invention will frequently be employed to assist in assaying the conditioned media for the content of the protein product and other factors.

The membrane utilized in the filter cartridge may be constructed from a wide variety of materials depending on the mechanical strength and chemical resistance required by the particular application. The membranes will generally be porous, with the pore size chosen to inhibit passage of the particulates to be separated while allowing the liquid phase of the suspension and certain soluble factors, such as proteins, to pass through in the permeate. Suitable materials include natural substances, such as cellulose and natural rubber; organic polymers, including non-polar polymers such as polyethylene, polypropylene, polycarbonate, nylon, and the like, and polar polymers, such as polyamides; and inorganic substances, such as sintered glass and ceramics The molecular weight cutoff of the filter membrane may vary widely depending on the desired separation, usually being in the range from about 0.1 to 1000 kilodaltons (kD), more usually being in the range from about 1 to 500 kD.

The filter membranes may assume a wide variety of geometries, including planar geometries, tubular geometries, spiral-wound geometries, and the like. Conveniently, hollow fibers composed of organic polymers with inside diameters as small as 10 microns may be utilized in certain applications. The membranes may also be formed as composites, with different membrane materials and/or different pore size materials being layered in order to provide for particular separation characteristics. The fabrication of membranes from any of these materials in virtually any of the geometries set forth is well known in the art and amply described in the patent and scientific literature.

For the separation of plasma from blood, the desired membrane material will be polycarbonate with a pore size in the range from about 0.1 to 0.6 $\mu$m. A 10 $\mu$m thick polycarbonate membrane can be formed by track etching pores of suitable dimensions. Using of such membranes avoids the need to add surfactants for wetting. The presence of surfactants in the separated plasma is undesirable for most purposes.

The present invention relies on providing a sufficiently vigorous shear force at the membrane surface in order to disrupt the concentration polarization layer which can result in plugging of the membrane filter. The magnitude of the shear force may be quantitated by determination of the Reynold's number ($N_{Re}$) of the relative oscillation between the membrane surface and the bulk of the colloidal suspension. The Reynold's number for the system of the present invention may be calculated as follows:

$$N_{Re} = d(\omega\rho/\mu)^{0.5}, \text{ where}$$

d = maximum displacement of membrane relative to bulk suspension (cm), which is equal to $r\theta$ for rotary oscillation where r is the radius of a curved membrane and $\theta$ is the maximum angular displacement in radians;
$\omega$ = frequency of oscillation of membrane relative to bulk suspension (sec$^{-1}$);
$\rho$ = density of colloidal suspension (g/cm$^3$); and
$\mu$ = viscosity of colloidal suspension (g/cm-sec).

Based on this calculation, the system Reynold's number should be at least about 1, preferably being at least about 2, more preferably being at least about 5, and usually being 10 or greater, for most applications. While there is no maximum theoretical Reynold's number, the system Reynold's number will usually not exceed 250, more usually being below about 100.

In addition to the limitation on Reynold's number, it has been found that the frequency ($\omega$) of relative oscillation between the filter membrane and the bulk suspension should be maintained in the range from about 25 to 250 Hz, usually being in the range from about 60 to 200 Hz, and preferably in the range from about 120 to 180 Hz and that the maximum relative displacement (d) should be maintained in the range from about 0.3 to 5 mm, usually being in the range from about 0.5 to 3 mm, and preferably being in the range from about 1 to 2 mm. For blood, the density ($\rho$) is about 1 g/cm$^2$ and the viscosity ($\mu$) is about 0.01 g/cm-sec.

Referring now to FIGS. 1 and 2, the general principles of operation of the present invention will be described In FIG. 1, a filter membrane 10 is connected to a mechanical linkage 12 which in turn is connected to a reciprocating actuator 14 which is schematically illustrated as a circular drive gear. A colloidal suspension is disposed on an upstream side 16 of the membrane 10, and a differential pressure is provided across the membrane so that permeate will flow to a downstream side 18 of the membrane.

The membrane 10 is linearly reciprocated in the direction of arrow 20 to reduce the concentration polarization layer of particulates which would occur under static conditions at the interface between the membrane 10 and the colloidal suspension. The frequency and displacement of the reciprocation are selected to provide a minimum Reynold's number which has been found necessary for adequate elimination of the concentration polarization layer to allow substantially free filtration through the membrane 10. The determination of the Reynold's number is discussed in more detail hereinbelow.

In FIG. 2, an alternate approach for establishing relative oscillation between the bulk colloidal suspension and a filter membrane is schematically illustrated. A discrete volume of a colloidal suspension is introduced to a tubular receptacle 26, which conveniently may be a hollow tube membrane having dimensions which enable it to hold the colloidal suspension by capillary action. At least one end of the tubular receptacle 26 is attached to a pressure pulsation generator 28, which is schematically illustrated as a piston and cylinder assembly driven by a reciprocating actuator 30. By varying the pressure within gas volume 32 at one end of the tubular receptacle 26, a reversing flow of the colloidal suspension within the receptacle 26 may be established. The frequency and displacement of the reversing flow may be selected to provide the critical Reynold's number, as discussed below. Flow of permeate across the membrane wall of receptacle 26 is caused by providing a differential pressure across the membrane, which is separate from the pressure pulsations inducing the reversing flow of the bulk suspension across the membrane receptacle 26.

Thus, the present invention can operate by either of two general principles. First, the filter membrane may be reciprocated (either linearly or rotationally as described in more detail hereinafter) relative to the colloidal suspension. The bulk of the colloidal suspension will remain in place due to the fluid inertia. An interfacial shear, however, will be created between the membrane and colloidal suspension, which shear is at a maximum at the boundary layer immediately adjacent to the filter and which quickly diminishes over short distances into the fluid. In contrast, by inducing a reversing flow in the colloidal suspension while holding the filter membrane steady, an interfacial shear will also be induced in the area of the membrane surface. When the fluid is moved, however, the fluid boundary layer immediately adjacent the membrane remains steady at the boundary layer and reaches a maximum a short distance from the boundary layer. This situation is not as efficient in removing the concentration polarization layer as when the membrane is actuated, but may be effective in very low volume applications.

Referring now to FIG. 3, a first embodiment 40 of the filter cartridge of the present invention will be described. Filter cartridge 40 includes a capillary tube receptacle 42 which includes a filter membrane 44 at its mid-section. Conveniently, the filter membrane 44 will be formed from a porous hollow fiber having a pore size suitable for the separation of interest. The end portions of the capillary tube receptacle 50 are conveniently formed from glass which may be fused to the filter membrane 44 by conventional techniques. An outer cylinder 46 is formed about the capillary tube 42 and includes a pair of annular walls 48 disposed on opposite sides of the filter membrane 44. The outer cylinder 46 and walls 48 together define a receiver chamber 50 about the membrane 44. A vacuum connection 52 is connected to the receiver chamber 50 so that a negative pressure may be applied to draw permeate through the membrane 44. The outer cylinder 46 includes a window opening 54 which allows observation (and pressure equalization) of the interior end of the capillary tube 42. An end plate 56 on the outer cylinder includes a connector pin 58 which may be linked to a base unit 60 (FIG. 4).

The capillary filter cartridge 40 is particularly useful for separating very small colloidal suspensions, typically in the range from about 10 to 500 μL, more typically in the range from about 50 to 250 μL. In particular, the capillary tube filter cartridge is intended for separating plasma from small volumes of blood. A drop of blood is drawn, typically by lancing a patient's finger. The blood may then be drawn into capillary tube receptacle 42 simply by contacting the open end of the tube with the drop of blood. The blood is immediately drawn into the capillary tube receptacle 42 by capillary action. The precise volume of blood will depend on the dimensions of the capillary and the volume of blood available. Conveniently, a capillary tube receptacle 50 having a diameter of about 0.2 cm and a length of about 5 cm will be useful for drawing blood samples having a volume in the range from about 50 to 150 μL.

Referring now to FIG. 4, a system for oscillating the capillary tube filter cartridge 40 will be described. The base unit 60 includes a mounting chuck 62 which is attached to an internal drive motor capable of linearly reciprocating the chuck in the direction indicated by arrows 64. Conveniently, the drive motor may be similar to a loud speaker induction motor operating at the desired frequency and amplitude. The base unit 60 will also include a vacuum hose 66 which is capable of connecting to vacuum connector 52 on the filter cartridge 40. In operation, the capillary tube filter cartridge 40 is linearly reciprocated while a vacuum is applied in the receiver chamber 50. The vacuum draws permeate into the receiver chamber 50 and back to the base unit 60 where it is collected. The volume of chamber 50 will typically be minimized in order to reduce permeate retention therein. It would also be possible to operate the capillary tube filter cartridge 40 by collecting the permeate in the chamber 50. In that case, the vacuum connection would be disposed upward so that permeate would collect in the closed portion of the chamber. It would also be necessary to increase the volume of the chamber sufficiently to hold the expected volume of permeate.

Referring now to FIG. 5, the capillary tube filter cartridge 40 could also be operated by reversing the flow of the bulk colloidal suspension rather than by oscillating the membrane. In that case, a base unit 70 would include a vacuum hose 72 substantially similar to the vacuum hose 66 in base unit 60. The base unit 70 would also provide a second pressure connection hose 74 having an adapter 76 at its end capable of mounting on the open end of capillary tube receptacle 42. A pressure pulse generator is provided inside the base unit 70 so that reversing flow within the capillary tube 42 may be induced.

Referring now to FIGS. 6 and 7, the construction of a vibrating leaf filter cartridge 80 will be described in detail. Generally, the vibrating leaf filter cartridge 80 includes a flexible receptacle envelope 82 and a leaf filter element 84 mounted within the envelope. The leaf filter element 84 includes a pair of planar membrane filters 86 which are sealed about a support plate 88. Screens 90 are placed on both an upper face 92 and lower face 94 of the support plate 88. A permeate collection conduit 96 penetrates the sealed planar membrane filters 86 and is secured to a post 98 formed on the support plate 88 By applying a vacuum through the conduit 96, permeate may be drawn and collected through both the planar membrane filters 86 and through the interstitial passages formed on the support plate by the screens 90.

In normal operation, the leaf filter element 84 is disposed within the flexible receptacle envelope 82, as illustrated in FIG. 6. By introducing the colloidal suspension into the receptacle 82, the entire leaf filter cartridge 80 may be vibrated by a suitable base unit (not illustrated) while a vacuum is drawn through the permeate collection conduit 96. At the particular frequencies of oscillation, the bulk suspension will remain static, while the filter element 84 oscillates relative to the bulk suspension. The vibrating leaf filter cartridge 80 is particularly suitable for separating relatively large volumes of blood, typically on the order of hundreds of mL. Conveniently, the flexible receptacle envelope 82 may comprise a conventional 450 ml blood bag, with the leaf filter element 84 inserted therein.

Alternatively, the leaf filter element 84 may be utilized without the flexible receptacle envelope 82. To do so, the leaf filter element 84 is immersed in an open volume of the colloidal suspension to be separated. The leaf filter element 84 may be vibrated while drawing a vacuum on the permeate collection conduit 96 in order to draw permeate from the colloid suspension until a desired volume of permeate has been separated. Use of the leaf filter element 84 as a sampling probe is particularly useful for sampling bioreactors and other large volume colloidal suspensions.

Referring now to FIGS. 8 and 9, a rotary shear disk filter cartridge 100 will be described. FIG. 8 is an exploded view illustrating a colloidal suspension receptacle 102, a cap 104 for enclosing an open end of the receptacle 102, and a permeate receiver chamber 106 for collecting the permeate as it is drawn from the receptacle 102. Colloidal suspension receptacle 102 includes a generally cylindrical body 108 having a disk-shaped filter membrane 110 at its lower end. The upper end of the receptacle 102 is open and includes an annular lip 112 which aids in collecting a sample onto the filter membrane 110. The permeate receiving chamber 106 includes a male flange 114 which with female port 116 formed at the lower end of the receptacle 102. The interior of the receiver 106 is thus open to the lower face of membrane 112 when the receiver is inserted into the lower end of the receptacle 102. A port 118 is formed in the side of receiver 106 to allow a vacuum to be drawn therein, as will be described in more detail hereinafter. An atmospheric vent 120 is formed in cap 104 to allow flow of permeate through the membrane.

Referring now in particular to FIG. 9, the rotary shear disk filter cartridge 100 is mounted in a base unit 126 including a receiving cup 128 and a control module 130. The receiving cup 128 is rotational mounted in the control module 130, and a motor for rotationally oscillating the receiving cup is provided therein. The receiving cup 128 further includes a vacuum channel 132 which is connected to a negative pressure source within the control module 130. Thus, when the rotational shear disk filter cartridge 100 is mounted in the cup 120, with the peripheral edge of the lip 112 sealing to the open end of the cup, a vacuum may be drawn in the receiver 106 by applying a negative pressure through the channel 132.

The cup 128 is rotated at a frequency and with a rotational displacement in order to provide the minimum Reynold's number according to the method of the present invention. It should be noted, however, that the rotary disk displacement will vary depending on the radial location along the membrane filter disk. At the center of the disk, of course, there will be no displacement while at the peripheral edge there will be a maximum displacement. In assessing whether the Reynold's number requirement of the present invention is met, it is necessary to determine over what percentage of the area of the membrane the rotary displacement is sufficient. Usually, it will be desirable that at least about 50% of the membrane have the minimum Reynold's number, more usually being at least about 60%, and preferably being 75% or greater. For filter membrane disks 110 having a diameter of about 2 cm, a rotational oscillation frequency in the range from about 25 to 250 Hz and an angular displacement in the range from about 0.05 to 0.5 radians is suitable.

The rotary shear disk filter cartridge 100 is particularly useful for treating very small blood samples, typically on the order of 10 to 250 μL, usually in the range from about 50 to 100 μL. A drop of blood may be drawn by lancing, and the blood drawn into the receptacle 102 using the lip 112. The blood is then tapped to the bottom of the receptacle so that it collects on the upper surface of the membrane 112. The blood will be spread evenly over the membrane by the rotary reciprocating motion, and the plasma drawn through the membrane by the application of a vacuum in the receiving cup 128. Both the receptacle 102 and receiver 106 are sealed during the separation process to avoid contamination of personnel with the blood and blood products. The plasma may be removed from the receiver 106 by removing the receiver from receptacle 102, allowing the plasma to be drawn from the receiver using a micropipette.

A rotary disk filter cartridge 140 intended for separating larger volumes of colloidal suspension is illustrated in FIG. 10. A cartridge 140 includes an upper receptacle chamber 142 having a septum 144 formed at the top for allowing the sterile introduction of the suspension to be separated. The lower end of the receptacle 142 includes a flared flange portion 146 having a membrane 148 sealed to its lower periphery. A permeate receiver chamber 150 is constructed similarly to the receptacle 142, except that a flared flange portion 152 is formed at the upper end and a septum 154 is formed at the lower end. The large ratio of membrane area to suspension volume increases the rate at which permeate is filtered, thus decreasing the necessary separation time for the volume.

In operation, the interior volumes of both the receptacle 142 and receiver 150 are evacuated and under a vacuum. After introducing the liquid to be separated through the septum 144, an air bleed port 160 is opened by removing foil tape 162 which covers the port. As the receptacle chamber 142 reaches atmospheric pressure, a pressure differential is created relative to the receiver chamber 150, causing flow of permeate downward through the membrane 148. The cartridge 140 will, of course, be rotationally oscillated at a frequency and rotational displacement within the scope of the present invention in order to avoid plugging of the membrane and allow substantially complete permeate flow. The permeate remains under sterile conditions within the sealed receiver chamber 150 until withdrawn through the septum 154.

Referring now to FIGS. 11-13, a filter cartridge 150 intended specifically for the collection and separation of blood for clinical testing is illustrated. The filter cartridge 150 includes an inner cylinder 152 mounted within an outer cylinder 154. A fixed wall 156 separates the interior of the inner cylinder 152 into a blood chamber 158 and a plasma chamber 160. An aperture 162 is formed in the cylindrical wall of the blood chamber 158 and includes a membrane filter 164 mounted thereover. The end of the blood chamber 158 is sealed by a septum 166, while the end of the plasma chamber 160 is sealed by a septum 168. A movable piston 170 is mounted in the blood chamber and, initially, is located relatively close to the fixed wall 156. A vent port 172 is formed through the walls of both the inner cylinder 152 and the outer cylinder 154 and is in communication with the blood chamber 158 in the volume between the movable wall 170 and the fixed wall 156. Prior to use, the vent port 170 is sealed with a detachable cover 174, typically metal foil tape.

A longitudinal channel 180 is formed on the interior wall of the outer cylinder 154 and extends from the membrane 164 to the plasma chamber 160. A corresponding slot 182 is formed through the wall of the inner cylinder 152 and is aligned with the channel 180 so that permeate flowing through the membrane 162 may pass through the channel 180 and slot 182 into the plasma chamber 160. Usually, a slack diaphragm 184 (FIG. 13) will be attached to the movable piston 170 to prevent fluid flow from one side of the piston to the other.

In operation, the filter cartridge 150 will initially be evacuated to below atmospheric pressure, typically to a pressure below about 10 mmHg. Blood is drawn into chamber 158 in a conventional manner using a double tipped needle (not illustrated). One end of the needle is inserted into the patient while the second end is inserted through septum 166 into chamber 158. The blood flows into the chamber assisted by the vacuum. After the chamber 158 has been substantially filled with blood, the needle is removed from the septum 166 and the filter cartridge 150 inserted into a mounting chuck 190 on a base unit 192 (FIG. 13). The tape 174 sealing vent 172 is then removed, allowing the volume between removable piston 170 and the fixed wall 156 to reach atmospheric pressure. The resulting differential pressure across the movable piston 170 will urge the piston leftward (as illustrated in FIGS. 11 and 13) against the blood in chamber 158. The pressure exerted by the piston 170 on the blood, in turn, will cause the flow of blood plasma through the membrane 164 and ultimately into the plasma chamber 160, as described hereinbefore. Backflow of the blood across the piston 170 is prevented by the slack diaphragm 184.

To prevent plugging of the membrane 164, the filter cartridge 150 is rotationally oscillated about its central axis by the base unit 192. Such rotational oscillation will cause the desired shear force at the face of membrane 164. Typically, for a filter cartridge having a diameter of approximately 1.5 cm, the rotational frequency will be about 100 Hz and the rotational displacement will be about 0.2 radians.

The following examples are offered by way of illustration, not by way of limitation.

EXPERIMENTAL

A 2 cm×2 cm leaf filter constructed as illustrated in FIG. 7 was immersed in a 50 mL beaker containing whole blood with an initial hemocrit of 0.48. The filter was vibrated at a frequency ($\omega$) of 150 Hz and five trials run with different displacements. A vacuum was drawn internally in the leaf filter so that a differential pressure approximately equal to 1 atmosphere (14.7 psi) was established. Permeate flow rate was measured at each of the displacements. The results are illustrated in FIG. 14.

It can be seen from FIG. 14 that the permeation rate falls to about zero as the relative oscillation between the filter membrane and the blood approaches 1. Thus, operation at a Reynold's number above about 1 is necessary for the operation of the present invention.

It was found that no hemolysis occurred in any of the samples tested.

Although the foregoing invention has been described in some detail by way of illustration and example for purposes of clarity of understanding, it will be obvious that certain changes and modifications may be practiced within the scope of the appended claims.

What is claimed is:

1. A method for separating particulates from a colloidal suspension in which plugging of a filter membrane is inhibited said method comprising:
   inhibiting plugging of a membrane from a sample blood suspension, by passing the suspension through the filter membrane, the filter membrane selected to substantially block passage of the particulates; and
   simultaneously inducing a relative oscillation between the filter membrane and the suspension with a frequency and displacement selected to provide a Reynold's number of at least about 1.

2. A method as in claim 1, wherein the filter membrane is oscillated while the suspension remains substantially static.

3. A method as in claim 1, wherein the colloidal suspension is oscillated while the filter membrane remains substantially static.

4. A method as in claim 1, wherein the suspension is passed through the membrane filter by providing a negative pressure on a downstream side of the membrane filter.

5. A method as in claim 1, wherein the suspension is passed through the membrane filter by providing a positive pressure on an upstream side of the membrane filter.

6. A method as in claim 1, wherein the frequency is in the range from about 25 to 250 Hz.

7. A method as in claim 6, wherein the displacement between the filter membrane and the suspension is in the range from about 0.3 to 5 mm.

8. A method for separating plasma from blood samples with a filter membrane, comprising: inhibiting plugging of the filter membrane, by
   introducing a blood sample into a receptacle having the filter membrane in contact with said blood sample;
   providing a differential pressure across the membrane to cause the plasma to flow therethrough;
   simultaneously reciprocating the receptacle in a direction substantially normal to the direction of blood plasma flow through the filter membrane with a frequency and displacement sufficient to disperse a concentration polarization layer at the membrane surface; and
   collecting the blood plasma as it flows through the filter membrane.

9. A method as in claim 8, wherein the frequency and displacement of the reciprocation are sufficient to provide a Reynold's number of at least about 1.

10. A method as in claim 8, wherein the receptacle is an open capillary tube and the blood sample is introduced by contacting a tip of the capillary tube with the blood sample.

11. A method as in claim 10, wherein the blood sample is a drop of blood drawn by lancing a patient's skin.

12. A method as in claim 10, wherein the filter membrane forms a portion of a wall of the capillary and the differential pressure is provided by drawing a negative pressure in a receiver jacket circumscribing the filter membrane.

13. A method as in claim 8, wherein the receptacle is an enclosed bag having flexible walls and wherein the filter membrane is mounted within the bag and attached to a receiver having a port external to the bag, said differential pressure being provided by drawing a negative pressure on the port.

14. A method as in claim 8, wherein the receptacle is defined by a cylindrical membrane filter and is mounted inside a rigid enclosure having a pressure port, said differential pressure being applied by drawing a negative pressure through said port.

15. A method as in claim 14, wherein the receptacle is rotationally reciprocated about a cylindrical axis of the membrane filter.

16. A system for separating particulates from a colloidal blood suspension in which plugging of a membrane filter by the particulated is inhibited, said system comprising:

the filter membrane selected to block passage of the particulates in the suspension;

means for passing the colloidal blood suspension through the membrane filter;

means for collecting permeate after it has passed through the filter membrane; and means for inhibiting plugging of the membrane by the colloidal blood suspension, including means for inducing relative oscillation between the filter membrane and the suspension with a frequency and displacement sufficient to provide a Reynold's number of at least about 1.

17. A system as in claim 16, wherein the filter membrane has a molecular weight cutoff in the range from about 0.1 to 1000 kilodaltons.

18. A system as in claim 16, wherein the means for passing the colloidal suspension through the membrane filter is a differential pressure generator connected across the filter membrane.

19. A system as in claim 16, wherein the differential pressure generator applies a negative pressure on a downstream side of the membrane filter.

20. A system as in claim 19, wherein the means for collecting permeate includes a receiver attached to a downstream side of the filter membrane and wherein said receiver is attached to the negative pressure.

21. A system as in claim 16, wherein the differential pressure generator applies a positive pressure on an upstream side of the membrane filter.

22. A system as in claim 16, wherein the means for inducing a relative oscillation includes means for reciprocating the membrane filter in a direction normal to the passage of the permeate therethrough.

23. A system as in claim 16, further comprising a receptacle for holding the colloidal suspension on an upstream side of the membrane filter.

24. A system as in claim 23, wherein the means for inducing relative oscillation includes means for applying an oscillatory pressure on the colloidal suspension in the receptacle, whereby the colloidal suspension is reciprocated past the filter membrane.

25. A system as in claim 16, wherein the means for inducing relative oscillation operates at a frequency in the range from about 25 to 250 Hz and imparts a displacement in the range from about 0.3 to 5 mm.

26. A system as in claim 25, wherein the means for inducing relative oscillation operates with a frequency and displacement selected to provide a Reynold's number greater than about 10.

27. An apparatus comprising: means for separating particles from a colloidal blood suspension, including:

an assembly including a filter membrane having an upstream side and a downstream side, a receiver attached to the downstream side to collect fluid passing through the filter membrane, and means for connecting a differential pressure across the membrane to induce fluid flow thereacross; and means for detachably mounting the assembly on an oscillator.

28. An apparatus as in claim 27, wherein the filter membrane is formed on at least a portion of the inside surface of a capillary tube.

29. An apparatus as in claim 28, wherein the receiver is a rigid jacket circumscribing the capillary tube.

30. An apparatus as in claim 29, wherein the means for connecting a differential pressure is a port in the rigid jacket.

31. An apparatus as in claim 27, wherein the filter membrane is a flat sheet.

32. An apparatus as in claim 31, wherein the filter membrane includes a pair of sheets sealed over a collection manifold which defines the receiver.

33. An apparatus as in claim 27, wherein the filter membrane is cylindrical and the receiver is a rigid enclosure circumscribing the filter membrane.

34. An apparatus as in claim 33, wherein the filter membrane is a hollow porous fiber.

* * * * *